N. SILVERTHORN.
Hog Cleaning Machine.
No. 44,021. Patented Aug. 30, 1864.
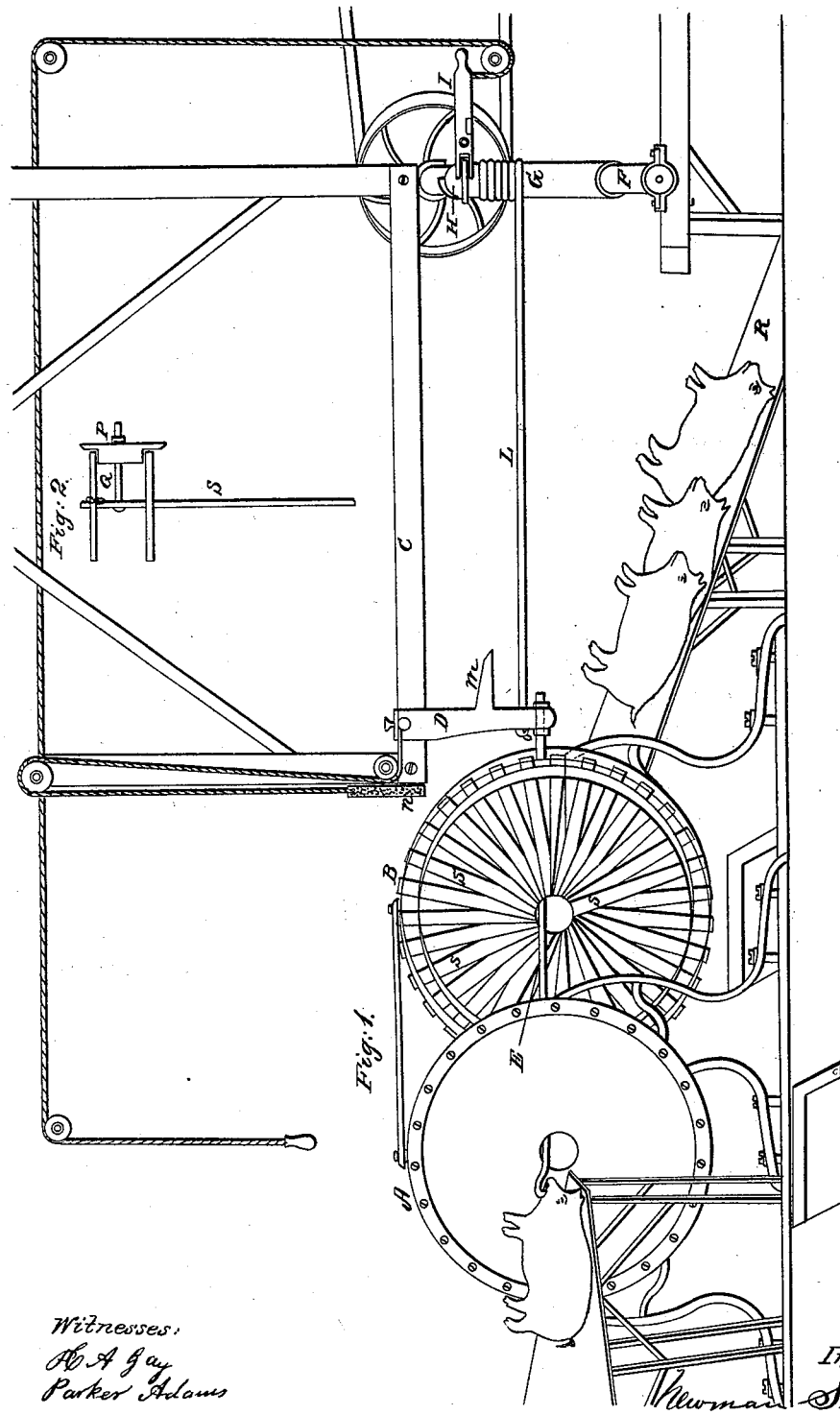

UNITED STATES PATENT OFFICE.

NEWMAN SILVERTHORN, OF PRESCOTT, WISCONSIN.

HOG-CLEANING MACHINE.

Specification forming part of Letters Patent No. 44,021, dated August 30, 1864.

*To all whom it may concern:*

Be it known that I, NEWMAN SILVERTHORN, of Prescott, in the county of Pierce, in the State of Wisconsin, have invented a new and Improved Machine for Removing off the Hair, Scurf, and Slime of Scalded Hogs; and I do hereby declare that the following is a full and exact description thereof, reference being had to the accompanying drawings, and to the letters of reference marked thereon, making a part of this specification, in which—

Figure 1 represents a perspective view of the machine; Fig. 2, a detail of construction, showing the manner in which greater rigidity is given to the scrapers when metal is used for the purposes of this invention.

The nature of my invention consists in applying to the whole body of scalded hogs disks, blades, or other device, composed of a sufficiently elastic substance or substances so formed or combined as to present sufficient force or adhesion and yet be elastic enough to yield to the irregularities of the body, and thus to remove the hair, scurf, and slime therefrom by mechanical means.

To enable others skilled in the art to make and use my invention, I will proceed to describe its construction and operation.

First. I take a circular disk of india-rubber, say, thirty-six inches in diameter and one inch in thickness, more or less, (this thickness can be made up of one or more sheets.) This disk is rigidly secured at its periphery to an iron frame by means of bolts and washers. This iron frame is secured to the floor in a perpendicular position. The rubber disk is provided with a hole in the center, of from two to three inches in diameter.

Second. I take two iron hoops or circles, one eight and the other seven feet in diameter and eight inches in width and one-quarter inch in thickness, and place the smaller circle within the larger, but concentrically therewith, and I divide both circles into forty-eight equal spaces, (more or less,) and insert in the center of each space a steel blade or scraper two inches (more or less) in width and one-eighth of an inch (more or less) in thickness. These scrapers are fastened in the outer ring, and so arranged that they will converge all to a common center within the rings, yet leaving a hole in the center of four inches (more or less) in diameter, those two rings being bolted or cast to an iron standard which is fastened to the floor in a perpendicular position. Greater rigidity can be imparted to the scrapers by tightening up on the nut P, the bolt of which connects the scraper and back in the center of the space between the two rings.

The parts being arranged as above described, any mechanical means may be employed to draw the hog through the centers of the first and second parts.

It is designed that either part will accomplish the desired object, but not so perfectly as when combined.

I would state that it is known by experts in scalding that when the proper moment is arrived they can take hold of a hog's leg, as close to his body as they can span with their hand, and by squeezing and pulling they can remove all the hair and scurf therefrom. Now, it is designed by this machine to make a similar application to the whole body upon the same principle at the proper moment. It is calculated that the capacity of this machine is from five to fifteen thousand per diem.

What I claim as my invention, and desire to secure by Letters Patent, is—

The apparatus herein described for removing from scalded hogs the hair, scurf, slime, &c., the same consisting, essentially, in the employment of substances of the requisite elasticity to yield to the irregularities of the body, while adhering thereto with the force necessary to remove the hair and impurities, as set forth.

NEWMAN SILVERTHORN.

Witnesses:
H. A. JAY,
PARKER ADAMS.